July 18, 1967           J. G. KERAMAS           3,331,482
FRICTION CLUTCH OPERABLE ON ROTATING SHAFT
Filed Sept. 20, 1965
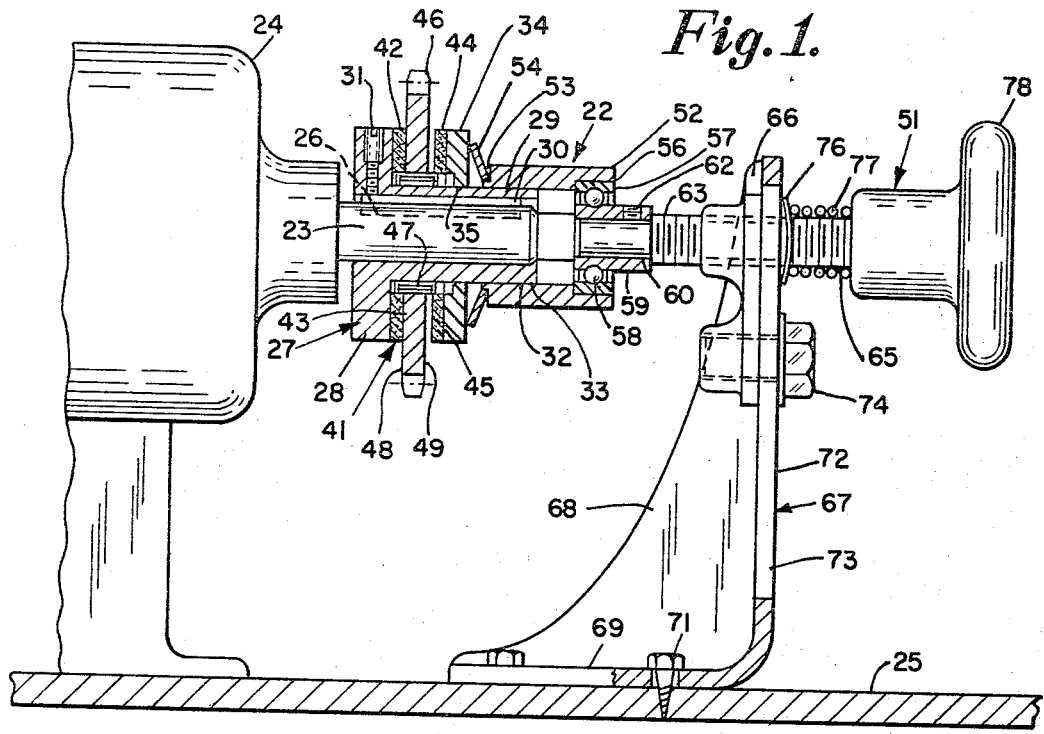
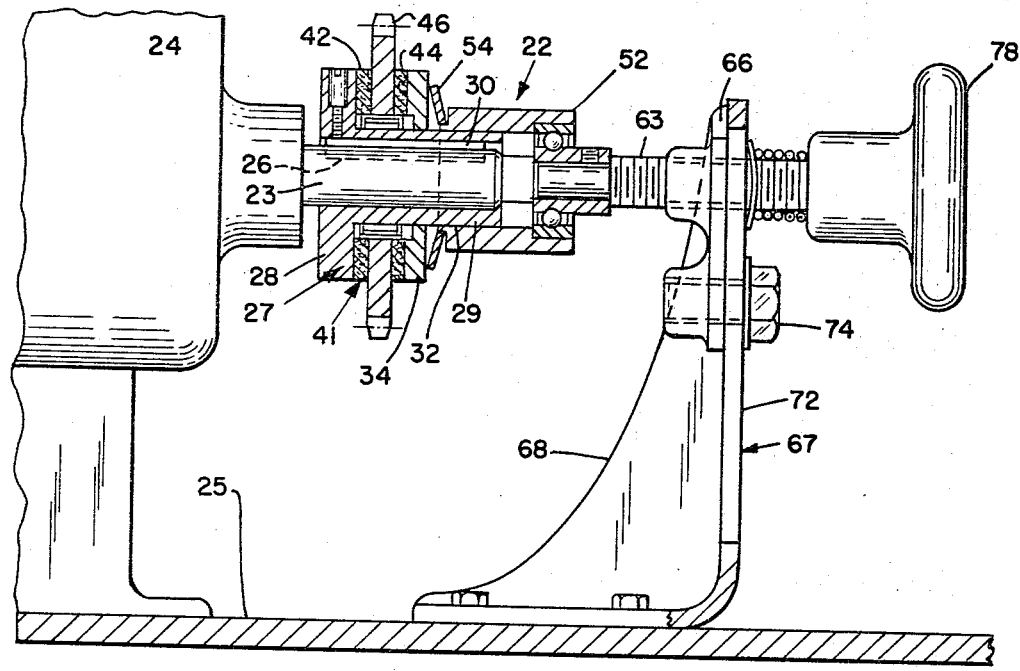
INVENTOR.
JAMES G. KERAMAS
BY
*Pearson + Pearson*
ATTORNEYS

United States Patent Office 3,331,482
Patented July 18, 1967

3,331,482
FRICTION CLUTCH OPERABLE ON
ROTATING SHAFT
James G. Keramas, 57 Kilby St.,
Woburn, Mass. 01801
Filed Sept. 20, 1965, Ser. No. 488,652
6 Claims. (Cl. 192—95)

This invention relates to an improved friction clutch mounted on a driven shaft and arranged to grip, or release, a driven element, such as a pulley, sprocket or gear, during rotation of the shaft.

Friction clutches have heretofore been proposed wherein the thrust screw is supported on the housing as in U.S. Patent 2,104,174 to Simons of Jan. 4, 1938. Such clutches have also been proposed wherein the thrust screw is supported on a driven hub as in U.S. Patent 894,361 to Bauroth of July 28, 1908. It has also been proposed to mount a threaded nut on a driven hub to actuate a friction clutch, as in U.S. Patent 3,092,983 to Huber of June 11, 1963.

However, in such prior art devices it is necessary to stop the machine in order to engage, disengage or adjust the torque of the friction discs while in this invention the clutch may be adjusted and operated during operation while the driven shaft is turning. Also, in such devices the mounting of the thrust screw actuator on the driven hub, or on the motor housing, creates space limitations which may be a disadvantage while in this invention the thrust screw is supported on a separate support means independent of the motor and hub. With the device of this invention, it is therefore a simple matter to replace the chain or belt driven by the driven sprocket or sheave, by moving the separate bracket and thrust screw out of the way.

The principal object of the invention is to provide a friction clutch, on a driven shaft, which can be engaged, disengaged and adjusted as to torque during operation by merely turning the hand knob of a thrust screw.

Another object of the invention is to provide an improved friction clutch assembly which is simple, rugged and of low cost and which permits unusually accurate adjustment of torque.

A further object of the invention is to avoid the use of a threaded hub carrying a threaded nut which rotates with the hub and to provide a smooth faced hub, and a non-rotating thrust screw, supported in a separate bracket, for sliding a smooth-faced, pressure applying collar on the hub to actuate the friction discs.

Other objects and advantages of the invention will be apparent from the claims, the description of the drawing and from the drawing in which:

FIGURE 1 is a side elevation, in half section, of the clutch of the invention in disengaged position, and FIGURE 2 is a view similar to FIGURE 1 showing the clutch in engaged position.

As shown in the drawing, the improved friction clutch 22 of the invention may be mounted on a drive shaft 23, for example the shaft of an electric motor, or gear reducer, 24, mounted on a suitable support such as 25. The drive shaft 23 conventionally includes a key slot 26.

Clutch 22 includes a hub 27 having an integral inner flange 28, an integral axially extending hollow cylindrical sleeve 29 and a suitable key, or set screw 31 engaged in the key slot 26 so that the hub rotates with the drive shaft. The outer face 32 of sleeve 29 is smooth and unthreaded and preferably is square or hexagonal in cross section at least at the outer end portion 22. An outer flange 34, having a bore 35 corresponding to the configuration of the sleeve 29, is axially slidable, but non-rotatable on the end 33 of sleeve 29, to permit axial translation without rotation of the flange 34. The flange 34 is keyed at 36 to fit in a suitable key slot 37 in the sleeve 29.

Annular friction disc means 41 is provided on clutch 22 comprising at least one annular disc 42 of friction material such as fiber, fixed to one of the opposed, inside faces 43 of one of the flanges 28 or 34. Preferably there are a pair of such discs 42 and 44, disc 42 being fixed to inside face 43 of outer flange 34 and disc 44 being fixed to inside face 45 of flange 28.

The driven element 46, which may be a sheave, sprocket, gear or the like is normally freely rotatable on bearings, such as needle bearings 47, on the sleeve 29 between the inner flange 28 and outer flange 34, as shown in FIGURE 1. The opposite faces 48 and 49 of the element 46 are preferably smooth for engagement by the friction discs, but if desired the faces 48 and 49 could be friction faces also.

Pressure applying means 51 in the form of a collar 52, of non-cylindrical cross section, is axially slidable and rotatable on the end 33 of sleeve 29. Preferably collar 52, and the end 33, are hexagonal in section, although the section could be of any other polygonal shape or a key and slot could be used. An outer peripheral recess 53 is formed in collar 52 to seat an annular leaf spring 54, of dished configuration, which bears against the outer flange 34 to transmit pressure resiliently and yieldably.

An inner peripheral recess 56 is provided in collar 52 to seat the outer race 57 of ball bearings 58, the inner race 59 being mounted on the terminal tip 60 of thrust screw 61. Tip 60 is preferably a sleeve, fixed by a set screw 62 to the cylindrical end 63 of the thrust screw.

The thrust screw 61 includes threads 65, threadedly engaged in a member 66 forming part of adjustable support means 67. Means 67 includes the L shaped bracket 68 having a base leg 69 fixed to support 25 by bolts 71. Bracket 68 also includes the upstanding leg, or post, 72, having an elongated slot 73 for a height adjustment bolt 74 threaded in the member 66. The bracket 68, thrust screw 61 and collar 52 may be removed or pivoted out of the way, by removal of bolts 71, to permit a belt or chain to be installed, repaired or replaced on the driven element 46. The thrust screw may be adjusted to be exactly coaxial with driven shaft 23 by suitable adjustment of member 66 by bolt 74.

A spring washer 76 and a coil spring 77 are provided on thrust screws 61 to prevent loosening due to vibration and to maintain spring pressure on the knob 78 in the direction of retraction.

As shown in FIGURE 2, the clutch 22 may be engaged, under any desired torque by turning knob 78 to advance the collar 52 and spring 54 thereby forcing the flanges and friction discs into contact with the driven element 46. Any desired slippage may be accurately secured by retracting the thrust screw or the clutch can be completely disengaged when desired, all while the device is in operation.

I claim:

1. A friction clutch for use on a motor driven shaft, said clutch comprising:

a hub detachably fixed on said shaft, said hub having an integral, inner flange, an integral, axially extending sleeve and an outer flange axially slidable on said sleeve;

a driven element, bearing-mounted on said sleeve between said inner and outer flanges for free rotation relative to said hub;

annular friction disc means on at least one of said flanges adapted to frictionally grip said element when said outer flange is axially moved toward said inner flange;

adjustable support means on the opposite side of said hub from said motor;

a thrust screw including a turn knob, threadedly mounted in said support means, said screw having a tip co-axial with said shaft at a spaced distance therefrom and being normally non-rotating;

a pressure applying collar axially slidable on, and normally rotatable with said sleeve, said collar being positioned between said outer flange and said thrust screw, and bearing means connecting the non-rotating tip of said thrust screw and said rotatable collar for transmitting axial translatory movement of said thrust screw to said collar and outer flange during the rotation of said driven shaft to control the frictional drive of said driven element.

2. A friction clutch as specified in claim 1 wherein:

said adjustable support means includes an upstanding slotted post, a member slidable therealong and bolts for fixing said member at desired positions, said member threadedly supporting said thrust screw;

whereby said support means is adjustable to position said thrust screw exactly co-axial with said driven shaft.

3. A friction clutch as specified in claim 1 wherein:

said friction disc means includes a pair of annular fiber discs, each fixed to one of the opposed faces of said inner and outer flanges, and said driven element includes a face on each opposite side thereof for engagement with one of said discs.

4. A friction clutch as specified in claim 1 plus an annular spring of dished configuration interposed between said outer flange and said collar whereby the pressure applied by said collar on said flange is resilient and yieldable and said spring compensates for wear on said discs.

5. A friction clutch as specified in claim 1 plus a spring washer and a coil spring interposed between said support means and the turn knob of said thrust screw for holding said thrust screw against undesired rotation due to vibration or transmitted torque.

6. A clutch for use on a motor driven shaft, said clutch comprising:

a hub detachably fixed on said shaft, said hub having an integral, inner flange, an integral, axially-extending sleeve and an outer flange axially slidable on said sleeve;

a driven element, bearing-mounted on said sleeve between said inner and outer flanges for normal free rotation thereon;

annular friction disc means on the opposed faces of said flanges adapted to frictionally grip said element;

a bracket, independent of connection with said motor and shaft, said bracket having a normally non-rotating thrust screw threaded therein co-axial with said motor driven shaft;

a pressure applying collar axially slidable on, and normally rotating with, said sleeve, said collar being positioned between said outer flange and said thrust screw bearing, means connecting said thrust screw and said collar for transmitting axial translatory movement to said rotatable collar from said normally non-rotating thrust screw, and spring means interposed between said outer flange and said collar for resiliently and yieldably transmitting axial movement of said collar to said outer flange.

References Cited

UNITED STATES PATENTS

| | | | |
|---|---|---|---|
| 616,198 | 12/1898 | Mundy | 192—97 |
| 1,913,944 | 6/1933 | Morin | 192—97 X |
| 2,244,169 | 6/1941 | Miller | 192—68 |
| 2,413,081 | 12/1946 | Shaeffer | 192—94 X |

BENJAMIN W. WYCHE III, *Primary Examiner.*